UNITED STATES PATENT OFFICE.

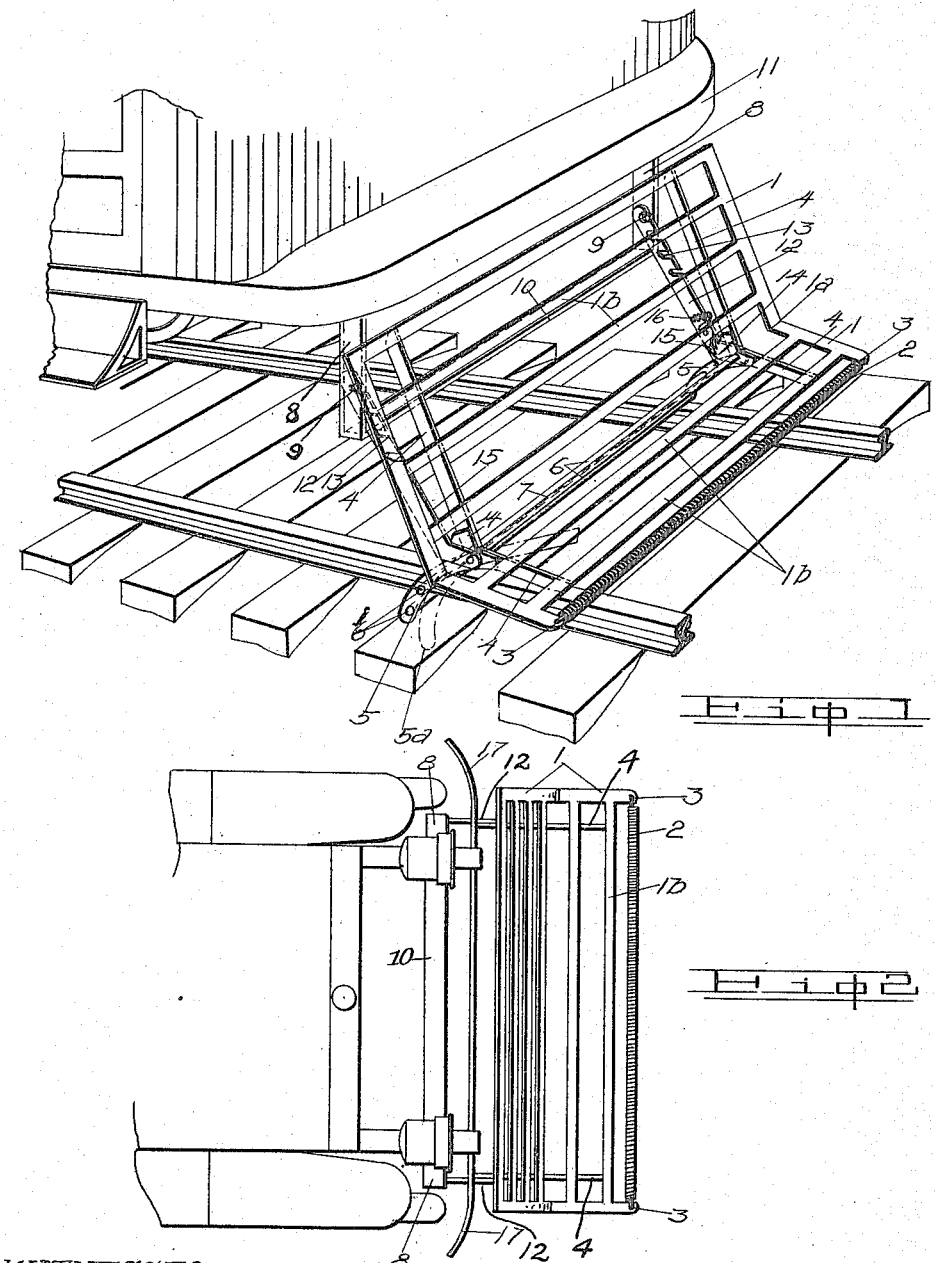

JAMES M. DOTY, OF VANCOUVER, WASHINGTON.

FENDER FOR VEHICLES.

1,129,179. Specification of Letters Patent. Patented Feb. 23, 1915.

Application filed July 26, 1913. Serial No. 781,337.

*To all whom it may concern:*

Be it known that I, JAMES M. DOTY, a citizen of the United States, residing at Vancouver, in the county of Clarke and State of Washington, have invented certain new and useful Improvements in Fenders for Vehicles, of which the following is a specification.

This invention relates to improvements in fenders for vehicles, and particularly for street cars and automobiles, and has for its object to provide an efficient and inexpensive fender which may be easily attached and adjusted. I attain this object by means of the improvements illustrated in the accompanying drawings, in which—

Figure 1 is a perspective elevation showing the fender attached to a street car. Fig. 2 shows a plan view of the fender as applied to an automobile.

Like numerals of reference indicate similar parts throughout the several views.

Referring to the drawing, 1 is a frame bent at 1$^a$ and provided with cross rods 1$^b$. A resilient bumper 2, made preferably in the form of a helical spring, is attached to the frame at 3. Frame 1 is fixedly mounted on L-shaped bars 4 carrying an extension frame 5 disposed below and toward the rear of the main frame 1 and provided with cross rods 6. A bracket having legs 8, each of which is provided upon its inner side with a laterally projecting pin 9, the two legs being connected at their lower ends by means of a foot piece 10, depends from the bottom of the car 11. Side bars 12 provided with notches 13 are adapted to engage the pins 9 and foot piece 10 of the bracket in such manner as to hold the bars slightly inclined toward the front. The lower ends of said side bars 12 are connected by a pivot rod 7 upon which the afore mentioned L-shaped bars 4 are pivotally mounted, thus holding the frame 1 in position and allowing it to rock forward or back as desired. Pivotal adjustment of frame 1 is obtained through the medium of ratchets 14 mounted on bars 4 and pawls 15 pivotally mounted on the side bars 12 and held in engagement by means of springs 16. This structure permits the frame 1 to tilt backwardly and prevents a return movement thereof. This movement will cause the extension 5 of the frame to swing to the position 5$^a$, onto the car track.

From the foregoing description and accompanying drawings it is obvious that when the bumper 2 strikes an obstacle, said obstacle will either fall onto and be carried by the fender or will be knocked down in front thereof. In either case it will cause the fender to tilt backward thus allowing the bumper 2 to pass over the obstacle. Pawls 15 and ratchets 14 will now hold the fender against any return movement, thereby holding the extension frame 5 against the rails and preventing the obstacle from being carried under the wheels of the car. Side bars 12 being provided with a plurality of notches 13, will allow the fender to be adjusted to the desired height above the rails. When applied to automobiles the fender may be provided with wheel guards 17 as shown in Fig. 2 instead of cross bars 6 shown in Fig. 1.

It is understood that slight changes may be made in the specific structure shown without departing from the spirit of the invention.

What is claimed, is—

1. A fender comprising a frame having cross bars, and carried in a nearly vertical position and having its lower portion bent forward, a resilient bumper attached at the forward edge thereof, L-shaped bars adapted to carry said frame, an extension frame beneath and toward the rear of said main frame, brackets adapted to be attached to the car and carrying pins and a foot piece, notched side bars adapted to engage the pins and foot piece of said brackets, a pivot rod carried by said side bars and passing through the aforesaid L-shaped bars in such manner as to allow the frame to tilt back and forth, ratchets rigidly mounted on said L-shaped bars, pawls pivotally mounted on said side bars, and springs for holding said pawls in engagement with said ratchets.

2. A fender comprising an L-shaped frame, brackets adapted to be attached to a car, side bars adapted to engage said brackets, a pivot rod carried by said side bars and adapted to pivotally carry the aforesaid frame, ratchets mounted on said frame, and pawls mounted on said side bars.

3. A fender comprising an L-shaped frame, an extension frame below said frame, brackets adapted to be attached to a car, side bars adapted to engage said brackets, a pivot rod carried by said side bars and adapted to pivotally carry the aforesaid main frame and extension frame, ratchets mounted on said main frame and pawls mounted on said side bars.

4. A fender comprising an L-shaped main frame pivotally supported with one section in vertical position at the angle thereof, an extension frame thereon disposed below and toward the rear, means whereby said vertical section may swing toward horizontal position and means for holding it at the limit of its movement.

5. A fender comprising an L-shaped frame adapted to be pivotally mounted at the front of a vehicle, an extension frame at the lower rear side thereof, means permitting a rearward tilting of the frame upon its pivots, and means preventing a return movement thereof, whereby, when an obstacle strikes the fender, the main frame will approach the horizontal and the extension frame will be depressed to the road surface.

In testimony whereof I affix my signature in presence of two witnesses.

JAMES M. DOTY.

Witnesses:
E. EARL FEIKE,
HAZEL A. ARMSTRONG.

Copies of this patent may be obtained for five cents each, by addressing the "Commissioner of Patents, Washington, D. C."